Jan. 23, 1945.　　　A. ANDERSON　　　2,367,654
MANUFACTURE OF LAPS
Filed Sept. 9, 1943　　　2 Sheets-Sheet 1
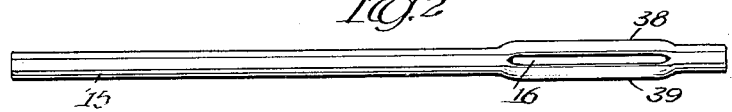
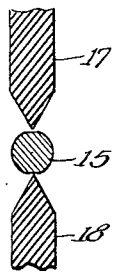
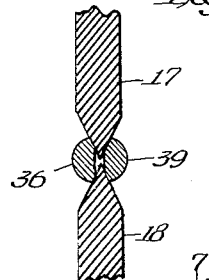
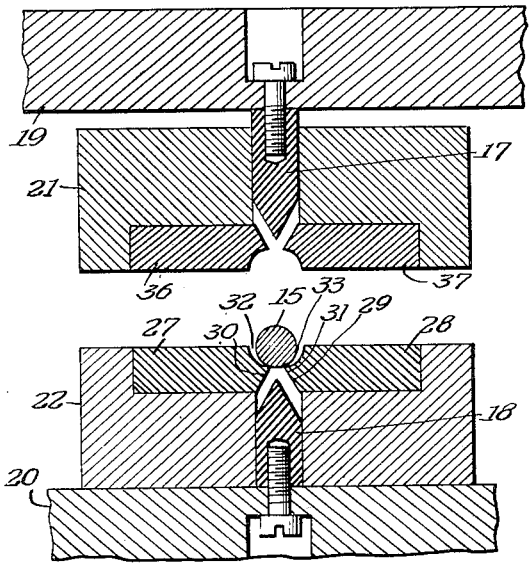
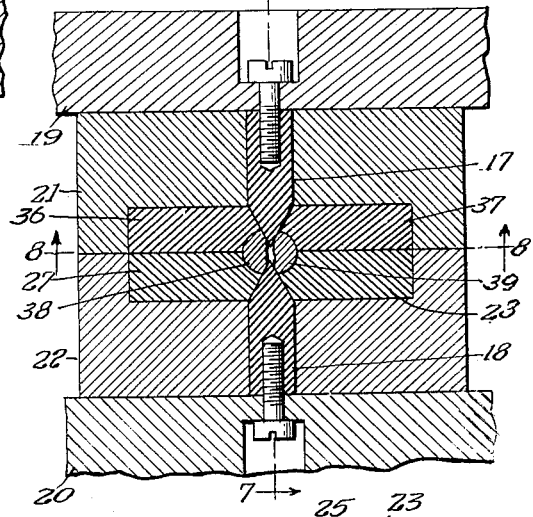
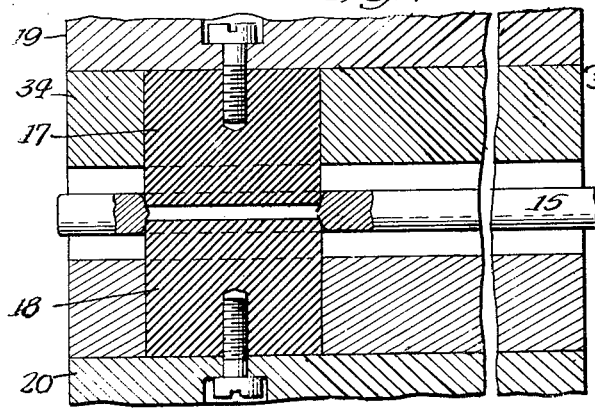
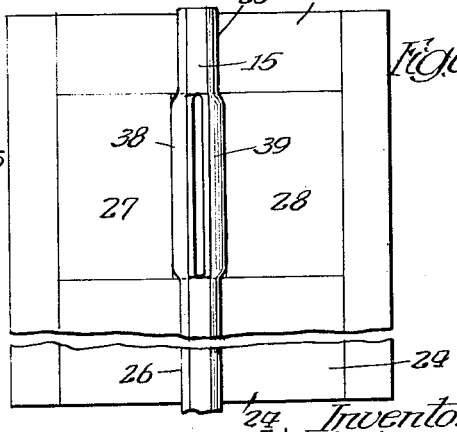
Inventor
Anton Anderson
By Glenn S. Noble Atty.

Jan. 23, 1945.     A. ANDERSON     2,367,654
MANUFACTURE OF LAPS
Filed Sept. 9, 1943     2 Sheets-Sheet 2
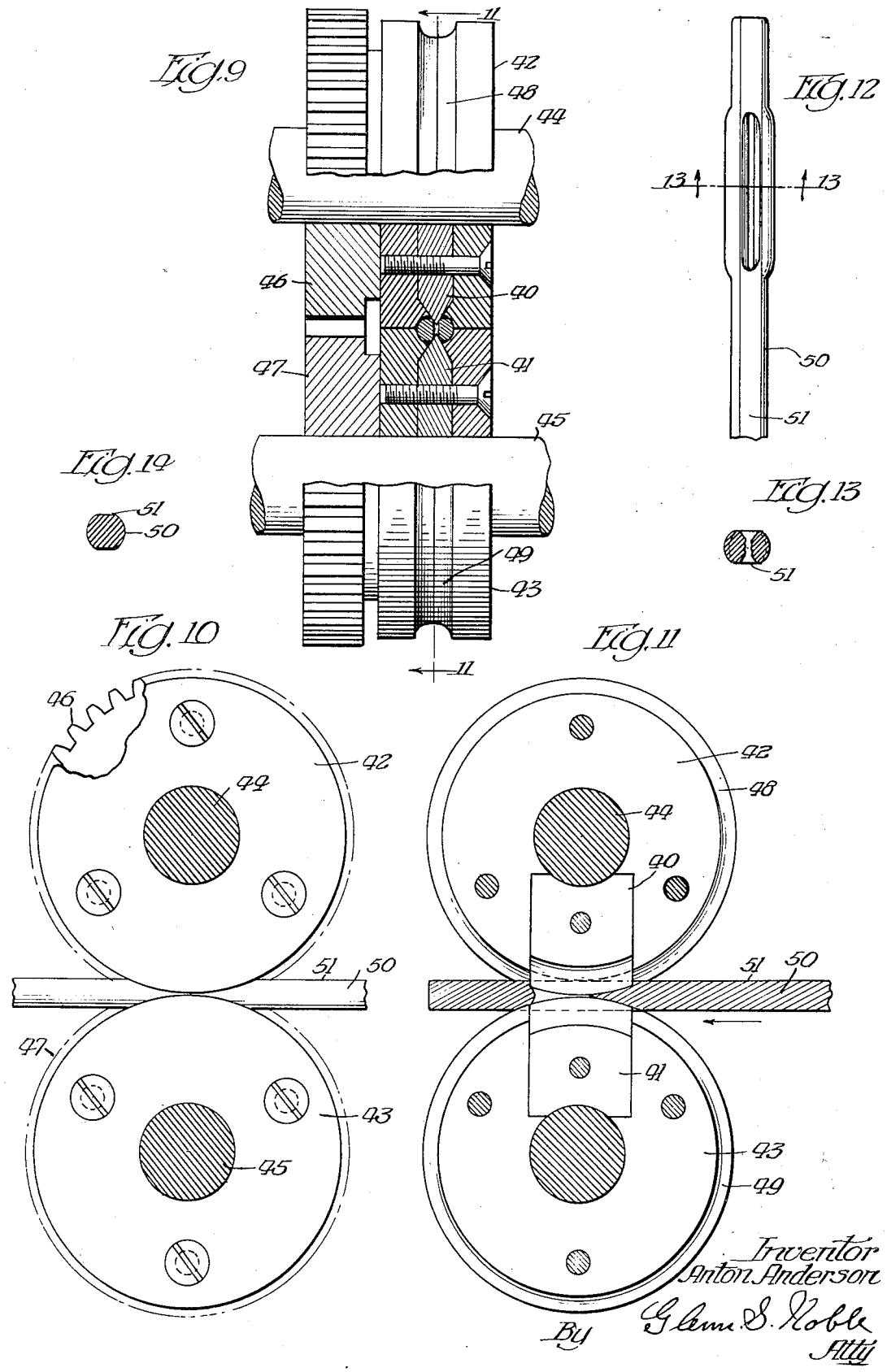
Inventor
Anton Anderson
By Glenn S. Noble
Atty Patented Jan. 23, 1945

2,367,654

UNITED STATES PATENT OFFICE 2,367,654

MANUFACTURE OF LAPS

Anton Anderson, Chicago, Ill.

Application September 9, 1943, Serial No. 501,661

7 Claims. (Cl. 51—204)

Although the present invention is directed to the manufacture of laps of various sizes, it is particularly applicable to the making of small laps or those on the order of approximately one-eighth of an inch in diameter or less such as used for lapping or finishing small holes. Laps, such as are in common use, usually consist of several parts, but in accordance with the present invention, I make the laps from a single piece of wire or rod. The smaller of these laps are very perishable or short-lived when in use and frequently may last not longer than ten minutes in ordinary work or practice, while the ones on the order of one-eighth of an inch in diameter frequently will not last more than twice as long as the smaller ones. As a consequence, it is desirable to make such laps at as low a cost as possible in order to provide large quantities of the same. In accordance with the present invention, I have made machines or apparatus which will make 200 laps per minute, and accordingly large quantities per day. For this reason, I am able to make these laps very economically and to supply them in large quantities at low cost.

The objects of this invention are to provide an improved lap together with novel methods and apparatus for making the same; to provide a lap formed of a single piece of wire having a working portion which may be readily spread or adjusted for size; to provide means for splitting the wire in the formation of the lap either by reciprocating or by rotating chisels or cutters; and to provide such other novel features and advantages as will be more fully described and claimed hereinafter.

In the accompanying drawings illustrating this invention,

Fig. 1 is a side view of the wire or stock used for making the lap;

Fig. 2 is a side view of one form of completed lap;

Figs. 3 and 4 are sectional views illustrating the splitting or cutting operation as performed by reciprocating chisels;

Fig. 5 is a sectional view of the splitting apparatus or die mechanism shown in an open position;

Fig. 6 is a view similar to Fig. 5 showing the completion of the cutting stroke;

Fig. 7 is a vertical sectional view taken substantially on the line 7—7 of Fig. 6;

Fig. 8 is a plan view taken substantially on the line 8—8 of Fig. 6;

Fig. 9 is a side view with parts broken away showing the rotating, cutting or splitting apparatus;

Fig. 10 is a front view of the apparatus shown in Fig. 9;

Fig. 11 is a sectional view taken substantially on the line 11—11 of Fig. 9;

Fig. 12 is a plan view of the lap as made with the rotating cutters;

Fig. 13 is a sectional view taken on the line 13—13 of Fig. 12; and

Fig. 14 is a sectional view showing the flattening of the wire preparatory to the cutting operation.

My improved lap may be made of any suitable stock or rod 15 which is preferably furnished in long lengths and cut off to make the several laps. This rod is slit or cut longitudinally as shown at 16 to form the lap. Such slitting or cutting may be done by the coaction of two chisels or cutters positioned so as to be diametrically opposite to each other with regard to the rod to be cut. Such chisels may be actuated by dies or reciprocating members of a machine tool or may be mounted in revolving rollers, the rotation of which is synchronized by means of gears so that when the rod is passed between the rollers, the chisels or cutters will cause the longitudinal slitting or splitting of the rod.

As shown in Figs. 3 to 8, the chisels or cutters 17 and 18 are mounted in die members 19 and 20 respectively and project through guideways in dies or blocks 21 and 22. The lower block is provided with two inserts or hardened plates 23 and 24 having semi-circular grooves 25 and 26 for receiving and holding the wire 15. It also has two intermediate plates 27 and 28 of the same length as the chisels with an opening 29 between them for the passage of the point or edge of the chisel 18. The adjacent edges 30 and 31 of the plates defining the opening 29, are beveled to conform to the bevel or edges of the chisel as best shown in Fig. 6. The opposed edges of the plates 27 and 28 have segmental grooves 32 and 33 respectively which define the lower half of the opening which is sufficiently large to correspond with the size of the lap after the wire has been slit.

The die or block 21 has inserted end plates 34 and 35 which are the same as the end plates 23 and 24 and coact therewith as will be readily understood. It is also provided with intermediate plates 36 and 37 which are similar to and coact with the plates 27 and 28 during the slitting operation.

When the lap is to be made, a piece of wire 15 is positioned between the several lower and upper die plates or members as shown in Fig. 5. When the press is actuated, the die members coact to first grip the wire and then the chisels or cutters 17 and 18 move relatively towards each other to engage the wire and split the same as shown in Figs. 4 and 6. During this splitting operation, the chisels first make longitudinal V-shaped incisions, spreading the sides of the wire to form the engaging portions 38 and 39 which project beyond the surface of the wire.

The sides or bevel of the chisel edges are at such an angle, preferably about 25° to the center line, that they will readily cut or split the wire and such that when the chisels reach positions at a short distance from the center, the lateral pressure will cause the metal to break, thus completing the slit without having the chisels approaching too close to each other. When the chisels have reached their final cutting position as shown in Fig. 6, the dies will again be open and the lap removed, which operation may be rapidly repeated in conformity with the usual operations of such a press or machine tool.

As shown in Figs. 9 to 11, the chisels or cutters 40 and 41 are mounted in coacting rollers 42 and 43 carried on parallel shafts 44 and 45, forming a part of any suitable machine tool or apparatus (not shown) for actuating the same. The rollers are kept in synchronism by means of gears 46 and 47 mounted on the respective shafts and driven therewith. Each roller is preferably made in two halves for convenience in manufacture, with the parts fastened together by means of screws and dowel pins as shown. They are provided with grooves 48 and 49 for receiving and feeding through, the blank or rod 50 from which the lap is to be made. The grooves in the two rollers correspond to approximately the diameter of the stock which fits closely therein in order to be fed through the rollers. The width of the groove is somewhat increased adjacent to the chisels to permit the necessary spreading or expansion of the metal during the slitting operation. In some instances, I have found it desirable to slightly flatten the stock as shown at 51, Figs. 10 and 14, for a distance approximately equal to the slot in order to have a flat surface with which the chisels may engage instead of engaging with the circumference of the circle.

When a lap is to be made with this mechanism, the stock or rod 50 is fed through between the rollers, a sufficient length being passed through before it is engaged by the chisels 40 and 41 as shown in Figs. 9 and 11 and which serve to carry the rod through after they have engaged the same. As these chisels encounter the flattened surfaces, they pass readily into the material making V-shaped cuts or grooves on each side of the rod as shown in Fig. 13 and when they have penetrated to a predetermined distance, the sides split apart, thus completing the lap as shown in Fig. 12. The lap, whether of the particular form or shape shown in Fig. 2 or shown in Fig. 12, is used with abrasive or polishing material and is preferably made of stock which is softer than the work piece which is being acted upon. The expanded portion or working sides of the lap being rigidly fastened together at the ends provide considerable resistance toward compression during the working operation and increase the efficiency of the lap. It will be readily understood that the size of the working portion may be readily increased by inserting a sharp tool in the slit and forcing the sides apart to any desired degree.

I have herein shown and described preferred forms of my invention and method of making the same, but modifications may readily suggest themselves as coming within the scope of the same and therefore I do not wish to be limited to such details except as set forth in the following claims in which I claim:

1. A lap, comprising a section of substantially round wire having a longitudinal slit with the adjacent side portions extending outwardly beyond the surface of the wire to form the working surfaces of the lap.

2. A lap consisting of a single element and comprising a round rod having a short longitudinal slit intermediate the ends thereof with the side portions along the slit projecting outwardly.

3. A lap comprising a substantially circular non-hollow rod having a longitudinal slit spaced from the ends thereof, the sides of the split portion extending outwardly beyond the outer wall of the rod to form the lapping surface.

4. A tool of the character set forth, comprising a unitary cylindrical member having a longitudinal slit with the walls adjacent to the slit extending outwardly and embodying all of the material of the cylinder along the slit, said walls being supported at either end by the solid portions of the cylindrical member.

5. A lapping tool of single unitary construction, consisting of a round metallic rod with a plurality of longitudinal integrally formed resilient ribs having their ends attached to the rod and having intermediate portions projecting outwardly beyond the outer surface of the rod to form the lapping areas.

6. A lap, comprising a substantially round metallic rod having a longitudinally sheared portion with a plurality of expandable sides, the outer surfaces of which provide lapping areas, substantially as described.

7. A new article of manufacture, consisting of a finishing tool of single or unitary construction, comprising a cylindrical member having a longitudinal slit severing the member into a plurality of longitudinal lapping elements adapted to be spread apart and to provide lapping surfaces, said elements including all of the stock adjacent to the slit and supported at both of the closed ends of the slit.

ANTON ANDERSON.